United States Patent
Cucchiella et al.

(10) Patent No.: US 12,330,131 B2
(45) Date of Patent: Jun. 17, 2025

(54) FLUIDIZED BED GRANULATION

(71) Applicant: STAMICARBON B.V., Sittard (NL)

(72) Inventors: Barbara Cucchiella, Gulpen (NL); Juan Gonzalez Coloma, Maastricht (NL)

(73) Assignee: STAMICARBON B.V., Sittard (NL)

( * ) Notice: Subject to any disclaimer, the term of this patent is extended or adjusted under 35 U.S.C. 154(b) by 0 days.

(21) Appl. No.: 18/850,232

(22) PCT Filed: Aug. 29, 2023

(86) PCT No.: PCT/NL2023/050442
§ 371 (c)(1),
(2) Date: Sep. 24, 2024

(87) PCT Pub. No.: WO2024/049293
PCT Pub. Date: Mar. 7, 2024

(65) Prior Publication Data
US 2025/0108349 A1    Apr. 3, 2025

(30) Foreign Application Priority Data

Aug. 29, 2022  (EP) .................................... 22192684

(51) Int. Cl.
*B01J 19/26* (2006.01)
*B01J 2/16* (2006.01)

(52) U.S. Cl.
CPC  *B01J 2/16* (2013.01); *B01J 19/26* (2013.01)

(58) Field of Classification Search
CPC .................................... B01J 2/16; B01J 19/26
(Continued)

(56) References Cited

U.S. PATENT DOCUMENTS 4,619,843 A    10/1986  Mutsers
4,701,353 A    10/1987  Mutsers et al.
(Continued)

FOREIGN PATENT DOCUMENTS

| EP | 0141436 A2 | 5/1985 |
| EP | 0141437 A1 | 5/1985 |
| WO | 2005049193 A1 | 6/2005 |

OTHER PUBLICATIONS

Roos. "Urea Granulation—Part 1, Granullation of Urea: Diamonds, Pearls and Stamicarbon Granules." Fertilizer Focus. May/Jun. 2013. 4 pages.
(Continued)

*Primary Examiner* — Huy Tram Nguyen
(74) *Attorney, Agent, or Firm* — Leason Ellis LLP

(57) ABSTRACT

The disclosure pertains to a fluidized bed granulation process, for instance for urea melt. An embodiment of the process comprises providing a fluidized bed of the particles in a granulation compartment of the fluidized bed granulator; forming a film of the granulation liquid in the form of a hollow conical frustum projecting into the granulation compartment by supplying the granulation liquid through a first channel of a granulation nozzle; supplying secondary gas stream through a secondary gas channel of the granulation nozzle into the granulation compartment, wherein the secondary gas channel is provided as an annulus around the first channel, wherein the exit of the secondary gas channel is directly exposed to the fluidized bed in the granulation compartment, wherein particles from the fluidized bed are entrained in said secondary gas stream.

15 Claims, 2 Drawing Sheets

(58) Field of Classification Search
USPC .......................................................... 118/303
See application file for complete search history.

(56) References Cited

U.S. PATENT DOCUMENTS

| | | | |
|---|---|---|---|
| 4,749,595 | A | 6/1988 | Honda et al. |
| 7,344,663 | B2 * | 3/2008 | Nishikawa ............. B01J 8/1854 |
| | | | 23/313 FB |
| 8,505,834 | B2 | 8/2013 | Luy et al. |
| 2006/0004928 | A1 | 5/2006 | Hess et al. |
| 2015/0258565 | A1 | 9/2015 | Filicicchia |
| 2018/0133727 | A1 | 5/2018 | Schmon et al. |

OTHER PUBLICATIONS

Meessen. "Urea." Ullmanns Encyclopedia of Industrial Chemistry. Wiley-VCH GmbH & Co. KGaA, Weinheim, 2010. 39 pages.
International Search Report for corresponding International Patent Application No. PCT/NL2023/050442, dated Dec. 4, 2023, 5 pages.
EP Intention to Grant for European Patent Application No. 23765016.3, dated Sep. 11, 2024, 35 pages.

* cited by examiner

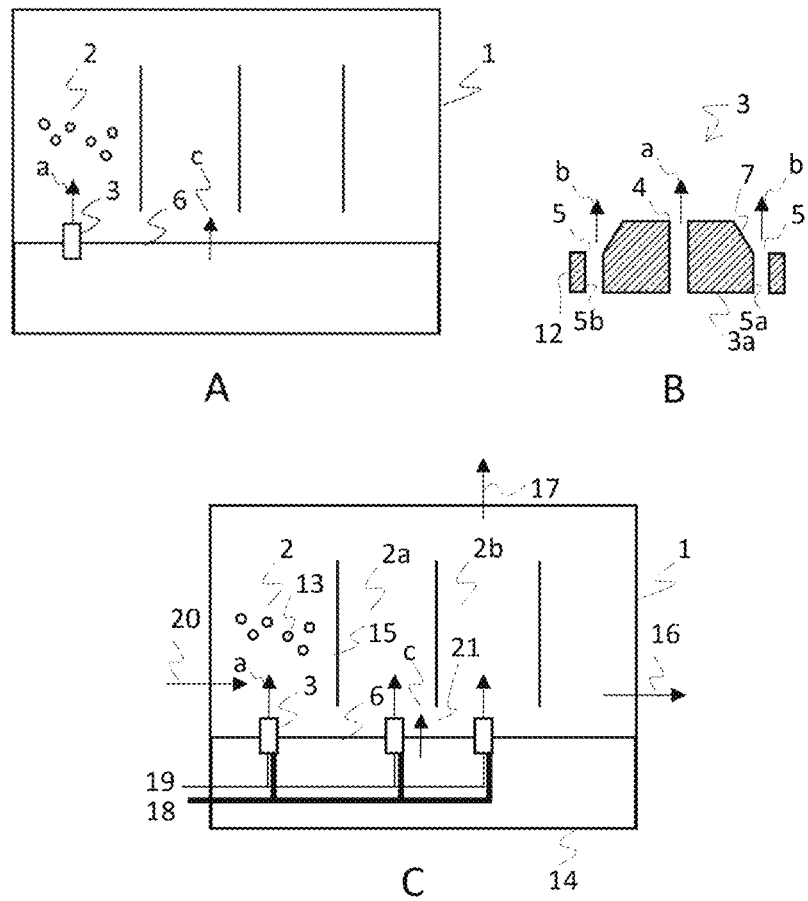
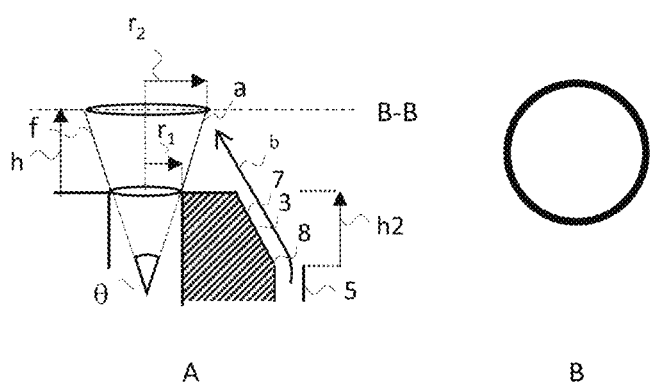
FIG. 1
FIG. 2

FLUIDIZED BED GRANULATION

CROSS-REFERENCE TO RELATED PATENT APPLICATIONS

This application is a U.S. National Stage Application under 35 U.S.C. § 371 of International Patent Application No. PCT/NL2023/050442 filed Aug. 29, 2023, which claims priority to EP 22192684.3 filed Aug. 29, 2022, which are incorporated by reference in their entireties.

FIELD

The invention pertains to granulation, for example of urea, in a fluidized bed granulator.

INTRODUCTION

Fluidized bed granulation of urea is an important technology for the large-scale production of solid urea particles suitable as fertilizer. A modern urea fluidized bed granulation unit (single line) typically has a capacity of over 1000 metric ton urea product per day (mt/d), e.g. above 2000 mt/d or even e.g. 3000 mt/d, or even higher (metric ton=1000 kg). Accordingly, high capacity granulation nozzles are desired, with capacity to spray well above 100 kg/h urea melt in an individual nozzle. Moreover, the overall granulator is desired to achieve a high conversion of the sprayed urea melt into on-size urea granules (i.e. low urea dust formation and low fraction of undersize and oversize granules) so as to desirably have relatively low dry recycle. Generally, a fluidized bed granulator comprises a granulation compartment in which a fluidized bed of particles is maintained by fluidization air supplied through a perforated bottom plate. A number of granulation liquid nozzles, that are provided at the bottom of the granulation compartment, supply granulation liquid upward into the granulation compartment. Typically a plurality of granulation compartments in series is used. Typically seed particles are provided at one side and granules are withdrawn at an opposite side of the granulator. This type of fluidized bed granulator is used e.g. for the production of urea granules. The invention pertains to granulation in such a type of fluidized bed granulator.

Ullmann's Encyclopedia of Industrial Chemistry, Chapter Urea, 2010 describes a number of fluidized bed granulation technologies for fertilized bed granulation.

In some of these known processes, the liquid material, for example in the form of a solution, melt or suspension, is with the aid of a gas sprayed to droplets, which on the fluidized nuclei solidify to form granules of the desired size. In order for the granulation process to proceed well, it is necessary that the surface of the grown nuclei solidifies sufficiently quickly to prevent agglomeration of individual particles. It must be ensured, therefore, that the sprayed liquid material crystallizes quickly, and that the water present evaporates quickly.

W. Roos, Urea Granulation—Part 1, Fertilizer Focus May June 2013 describes the Stamicarbon granulation technology which uses film spraying. High velocity hot air (secondary air) and urea melt are supplied through a nozzle. The secondary air stream is supplied through an annulus around the urea melt nozzle. In operation, the particles in the fluidized bed are sucked into the liquid film of urea melt exiting from the nozzle by the secondary air and are 'wetted' by the urea melt. The wetted particles flow upward into a part of the fluidized bed.

EP 0141437 describes a granulation process wherein the liquid material is made to come out of a central channel as a virtually closed, conical film, with a thrust exceeding the thrust of the powerful gas stream. This film is nebulized to very fine droplets with the aid of the powerful gas stream. It was observed in the examples that upon impact, the film was virtually instantaneously nebulized in the air stream. The figures show that the exit of the concentric channel for the powerful gas stream (secondary gas) is shielded from the fluidized bed by a cover.

EP 0141436 describes a granulation process wherein the liquid material is made to exit from a central channel into the fluidized bed as a virtually closed, conical film. Nuclei from the bed are carried through the film with the aid of the powerful gas stream and next, during transport of the so moistened nuclei through a zone above the nozzle, the liquid material taken up by the nuclei is allowed to solidify.

Important desires for the granulation process include low dust formation and a high throughput, and a high fraction of desired-size particles in the granules as withdrawn from the granulator.

It is also desired to provide a fluidized bed granulation process, and a nozzle for such a process, wherein the throughput per nozzle is relatively high (e.g. kg urea melt per hour per nozzle).

SUMMARY

The invention pertains in a first aspect to a fluidized bed granulation process which comprises growth of particles in a fluidized bed granulator by causing a granulation liquid to solidify on the particles. The process comprises: providing a fluidized bed of particles in a granulation compartment of the fluidized bed granulator; forming a film of the granulation liquid in the form of, i.e. provided as, a hollow conical frustum projecting into the granulation compartment by supplying the granulation liquid through a first channel of a granulation nozzle; supplying secondary gas stream through a secondary gas channel of the granulation nozzle into the granulation compartment, wherein the secondary gas channel is provided as an annulus around the first channel, wherein the exit of the secondary gas channel is directly exposed to the fluidized bed in the granulation compartment, wherein particles from the fluidized bed are entrained in said secondary gas stream; and supplying entrained particles to said film by directing the secondary gas stream towards the film, causing the deposition of the granulation liquid on the surface of the particles and solidification of said deposited liquid resulting in growth of the particles. In embodiments, the mass ratio of the secondary gas flow to the granulation liquid flow is at least 0.40 and preferably in the range 0.40-1.0.

The invention also provides a granulation nozzle for a fluidized bed granulation process, comprising a first channel for granulation liquid and a secondary gas channel, wherein the secondary gas channel is provided as an annulus around the first channel, wherein the exit of the first channel comprises a diffuser that is sloped and outwardly curved to provide a convex surface for the granulation liquid exiting the first channel; in particular to provide a surface that is convex in a vertical cross-section and that is in operation exposed to the granulation liquid that is ejected from the first channel. Also provided is a fluidized bed granulator comprising the nozzle, a urea plant comprising the fluidized bed granulator, and a granulation process carried out using the nozzle. The process of the first aspect is optionally carried out with the inventive granulation nozzle.

BRIEF DESCRIPTION OF THE DRAWINGS

FIG. 1 schematically illustrates an example granulator that can be used in embodiments of the invention (FIG. 1A: cross section, FIG. 1B; detail; FIG. 1C: detailed view of preferred embodiment).

FIG. 2 schematically illustrates a cross-section of an example granulation nozzle that can be used in the invention.

Figure 3:
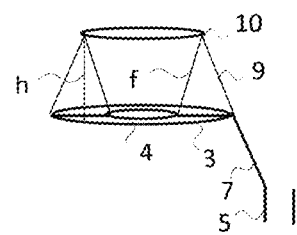
FIG. 3 schematically illustrates the impact height, as used in embodiments of the inventive process.

Any embodiments illustrated in the figures are examples only and do not limit the invention.

DETAILED DESCRIPTION

The invention pertains in an aspect to a fluidized bed granulation process. The process involves growth of particles in a fluidized bed granulator by causing a granulation liquid to solidify on the particles.

The inventive fluidized bed granulation process comprises growth of particles in a fluidized bed granulator. An example fluidized bed granulator is schematically illustrated in FIG. 1A. The granulator (1) comprises a granulation compartment (2) configured for holding a fluidized bed of particles. The granulator (1) also comprises nozzle (3). As shown in more detail in (vertical) cross section in FIG. 1B, the nozzle (3) comprises a first channel (4) for granulation liquid (a) and a secondary gas channel (5) for the secondary gas (b) that is provided as an annulus (ring) around the first channel. The channels have an exit at the top side directly exposed to the fluidized bed of particles. The exit of the first channel is e.g. vertically above the exit of the secondary gas channel. The granulator also comprises a perforated fluidization plate (6) for fluidization gas (c). The nozzle (3) preferably comprises a unitary piece (3a). The piece (3a) has a channel for granulation liquid, i.e. the first channel (4), and has a tapered shoulder (7) and provides the convex inner wall (5a) of the annular channel (5) for secondary gas. A further piece (12) provides the concave inner wall (5b) of the annular channel (5) and is e.g. cylindrical.

In operation, granulation liquid (a) is ejected from the first channel (4) and applied onto the particles (13) that are kept in fluidized state by the fluidization gas (c).

In the typical embodiment of the granulator and of a granulator in which the process can be carried out as shown in FIG. 1C, reference numbers which are not discussed are the same as in FIG. 1A. The features of FIG. 1C are preferred for all embodiments of the invention.

The fluidization gas is introduced into the granulation compartments (2); in particular to each of them, through perforations in perforated fluidization plate (6) provided at the bottom of the granulation compartments (2), usually from one or more fluidization gas chambers (14) located below the perforated fluidization plate. In a preferred embodiment, the granulator is provided with a plurality of granulation compartments in series (2, 2a, 2b), e.g. at least 3, e.g. 3 to 5 granulation compartments in series, which each contain a plurality of the nozzles (3) (that are operated with the specified ratio of secondary gas to granulation liquid and/or have the curved diffusor) and which compartments are separated from each other by vertical dividing plates (15) which provide for an separation of the fluidized bed into compartments and which provide for passageways (21) for particles at a bottom end, i.e. a spacing between the bottom of the dividing plate and the fluidization plate, such that preferably larger particles preferentially move between adjacent compartments, and by the effect of the particles inlet and outlet at opposite sides of the granulator, effectively from an upstream to an adjacent downstream compartment. The dividing plates are e.g. mounted to the sidewalls of the granulator. The use of a plurality of granulation compartments arranged in series, separated by such dividers, and each comprising nozzles, provides for a better controlled residence time of the particles in the granulator.

The particles are removed through a particles outlet (16) that is arranged at a downstream side of the series of granulation compartments, and preferably supplied to size-classification. The gas is withdrawn through a gas outlet (17) at an upper part of the granulator. Granulation liquid, e.g. urea melt, is supplied to the nozzles through a supply manifold (18). Secondary gas (e.g. air) is also supplied to the nozzles using a secondary gas supply manifold (19). Dry recycle is optionally supplied as seed particles through particles inlet (20) that is provided an upstream side of the series of granulation compartments. In some embodiments, the dry recycle is separately molten to urea melt and solidified in a separate unit such as a pelletizer to give seed particles which are introduced through the particles inlet (20). In some embodiments, the dry recycle is directly introduced into particles inlet (20).

The particle inlet and particles outlet are provided at opposite sides of the granulator, in the vertical cross-section of the granulator in the granulator length direction of FIG. 1C. In operation, a gradient of the average particle sizes is maintained over the series of granulation compartments, with a larger average particle size in the downstream compartments; with downstream indicating a compartment closer to the particles outlet. The granulation compartments are arranged in series in the length direction of the granulator. Optionally, as illustrated, a downstream compartment is a cooling compartment receiving fluidization air but without nozzles. Usually, the fluidized bed of particles is maintained in all granulation compartments and any cooling compartment. Growth of the particles is based on the layer-by-layer accretion of solidified granulation liquid to achieve desired-size particles and significant volume increase of the individual particles.

In a preferred embodiment, the fluidized bed granulator comprises in series, an upstream and a downstream granulation compartment, as discussed, wherein the upstream compartment comprises a particles inlet, and the downstream compartment comprises a particles outlet or is adjacent to a downstream cooling compartment which comprises a particles outlet. Optionally, one or more intermediate granulation compartments are provided between the upstream and downstream granulation compartments.

The present process can be used for the granulation of various kinds of liquid materials. The granulation liquid is for example in the form of a solution, melt or suspension. The granulation liquid should comprise or essentially consist of a component that is, or one or more components that are, solid at ambient temperature (e.g. 20° C.) so as to permit solidification of the liquid. The granulation liquid for instance comprises at least 80 wt. % in total of one or more compounds that are solid at 20° C. The granulation liquid comprises e.g. less than 10 wt. % water or less than 5 wt. %. The process may be used e.g. for the granulation of water-containing liquid materials, where besides solidification quick evaporation of water should take place. The present process is for instance used for the granulation of materials such as ammonium salts, such as ammonium nitrate, ammonium sulphate, or ammonium phosphate and mixtures thereof, single fertilizers such as calcium ammonium nitrate, magnesium ammonium nitrate, compound NP and NPK fertilizers, urea and urea-containing compounds, sulphur, organic substances such as bisphenol and caprolactam, and the like. In a preferred embodiment, the process is used for granulation of urea and urea-containing compounds.

In a particularly preferred embodiment, the granulation liquid is a urea melt which comprises e.g. at least 80 wt. % urea. The urea melt comprises e.g. max. 3 wt. % water. The urea melt comprises e.g. at least 90 wt. % urea and biuret, max. 3 wt. % water, and e.g. up to 7 wt. % other components such as, e.g., formaldehyde, or ammonium salts or sulphur, or a combination thereof. The granulation liquid comprises in some embodiments e.g. at least 97.5 wt. % urea including biuret.

Typically the granulation liquid has a temperature in the nozzle of 5° C.-15° C. above the solidification temperature of the granulation liquid.

The bed of particles is kept in a fluidized state in the granulation compartment by upward flowing fluidization gas, in particular an air stream. In embodiments with an average particle size of the final product of 2-4 mm a fluidization gas with a superficial velocity of 1.5-2.5 m/s, in particular 1.7-2.2 m/s is preferably used. The height of the bed can be chosen within wide limits, for example 50 to 150 cm. The fluidization gas typically is also used for cooling of granulation liquid on particles to cause solidification. The fluidization gas has for instance a temperature of less than 100° C., e.g. less than 80° C.

The fluidization gas is typically supplied into the granulation compartment homogenously from the bottom of the granulation compartments using a perforated fluidization plate. The granulation nozzles are typically mounted through openings in the fluidization plate that are larger than the openings used for supply of fluidization gas.

A fluidized bed of particles is maintained in the granulation compartment(s). These particles can also be referred to as nuclei or seed particles. As is conventional, typically seed particles are supplied and product particles are withdrawn at opposite sides of the granulator. Moreover particles are kept in motion in the fluidized bed. Typically, the granulator comprises two or more granulation compartments in series. In particular, the fluidized bed is typically compartmentalized by vertical baffles with a flow of relatively heavier particles from one compartment to the next compartment through openings at the lower side of the baffles.

The seeds are not particularly limited in composition and can have the same or different composition as the granulation liquid. For example, crushed oversize and undersize granules can be recycled to the granulator and be used as seeds, or pellets from a pelletizer or prills from a prilling tower can be used as seeds. Other types of seeds are also possible.

The seeds for instance have an average diameter of at least 0.75 mm, e.g. in the range 1-3 mm, e.g., 1.5-2.5 mm. Seed average diameter is suitably the weight average median diameter.

The quantity of seeds introduced may vary. For example such an amount of seeds is introduced that the weight ratio of the seeds relative to the granulation liquid is between 1:1 and 1:3; the same example range applies for the volume ratio.

The process involves growth of particles in the fluidized bed by causing the granulation liquid to solidify on the particles. The process of growth of a seed to a desired size product granule typically involves multiple passes of the particle through (hollow) conical films of the granulation liquids above nozzles. The growth process is hence based on the layer-by-layer accretion of solidified granulation liquid.

The product particles are typically (substantially) spherical and have for example a diameter of at least 2.0 mm, e.g. in the range 2.0-8.0 mm.

The process involves the formation of a film of the granulation liquid in a form of a hollow conical frustum (i.e. conical film) projecting into the granulation compartment by supplying the granulation liquid through a first channel of a granulation nozzle. In the process, the granulation liquid is ejected from the first channel as a film of the granulation liquid, which film has the shape of a hollow conical frustum.

As schematically illustrated in FIG. 2A, the hollow conical frustum (f) of the film of granulation liquid (a) has a smaller radius r1 at the nozzle and a larger radius r2 at a height h in said upward direction above the nozzle (3) and the process involves contacting the film with the secondary gas stream (b) at height h (the impact height). The conical frustum has a vertex angle (θ). The nozzle (3) (in particular the piece (3a)) has a sloped shoulder (7) that guides the secondary gas (b) from the secondary gas channel (5) to the hollow conical film (f). The lower end (8) of the shoulder (7) is, for example and as illustrated, directly adjacent to the secondary gas channel (5). This sloped shoulder is also preferred for the inventive fluidized bed granulation process, independently of the use of a diffusor. FIG. 2B indicates a horizontal cross-section of the film of granulation liquid (a) through B-B, showing that the film is in the shape of a conical frustum (f) that is hollow. An example film thickness at the impact height is calculated to be about 90 μm.

The nozzle is accordingly suitable a hollow cone nozzle.

The granulation nozzle is provided at the bottom of the granulation compartment and the nozzle is arranged with the exit in upward direction. The granulation liquid exits the nozzle in the upward direction.

Preferably, the conical film is formed by giving the liquid material a rotational movement, in particular in the first channel; with rotation in the horizontal cross section or in the horizontal plane, i.e. about a vertical axis.

For example a nozzle provided with a rotation chamber is used (also referred to as swirl chamber). A rotation chamber (swirl chamber) is for example a cylindrical chamber upstream of the granulation liquid exit having tangential inlet openings, e.g. provided as slits. in the cylindrical wall of the chamber for granulation liquid; the chamber is at the top connected, in particular directly connected, to the outlet for granulation liquid. The outlet channel typically has a smaller diameter than the rotation chamber. In this arrangement, the liquid is under hydrostatic pressure pressed through one or more channels leading into the rotation chamber tangentially. The material, i.e. granulation liquid, moves in the form of a liquid film along the wall of the outlet channel (first channel) and has a horizontal velocity component there, i.e. in the outlet channel, resulting from the rotation, and a vertical velocity component depending on throughput. Hence, the process involves preferably supplying the granulation liquid as a rotating film through the first channel, with rotation in the horizontal cross-section.

Example suitable rotation chambers are shown and described in EP 0141437A and EP 0141436A.

Hollow cone nozzles with a swirl chamber are also known as tangential-flow hollow cone nozzles.

In a further embodiment, the nozzle is an axial hollow cone nozzle. Such nozzles typically comprise a swirl insert with spiral grooves to cause whirling of the liquid.

In general, the liquid material is preferably supplied under a hydrostatic pressure of at least 3 bar absolute or at least 4 bar absolute, e.g. up to 7 bar absolute, or up to 5 bar absolute.

Preferably, a liquid velocity of at least 15 m/s is used for the granulation liquid, more preferably at least 17 m/s, and e.g. up to 50 m/s or up to 25 m/s. The liquid velocity, as used herein, typically includes the rotational component.

The vertex angle of the conical frustum of the film is e.g. in the range of 50-160°, preferably 70-110°, in particular 80-100°. The vertex angle $\theta$ is schematically illustrated in FIG. 2.

The film preferably has a thickness of at least 300 µm, or at least 400 µm, more preferably at least 450 µm at the exit of the first channel, and the thickness is e.g. less than 600 µm. Suitable, the granulation nozzle is of the type giving a film with a thickness of at least 400 µm, e.g. in the range of 400 µm to 600 µm. The film thickness at the impact height is e.g. in the range of 80-120 µm.

Preferably the diameter of the first channel at the exit is at least 3.0 mm or at least 4.0 mm. A relatively large diameter contributes to a large throughput.

The method furthermore involves supplying secondary gas through a secondary gas channel of the granulation nozzle into the granulation compartment. The secondary gas channel is provided as an annulus around the first channel and is typically concentric with the first channel. The secondary gas channel is preferably immediately adjacent to the granulation nozzle, such that the nozzle comprises a wall that is in operation at one side in contact with the granulation liquid and at the other side with secondary gas.

The secondary gas is supplied substantially upward into the granulation compartment and may be e.g. made to converge at a small angle of e.g. 5-25°, and preferably 5-15°. In some embodiments, the outlet opening for the secondary gas is made to converge at a small angle of e.g. 5-25°, and preferably 5-15°.

Importantly, the exit of the secondary gas channel into the granulation compartment is directly exposed to the fluidized bed in the granulation compartment. Hence, the exit is in unobstructed contact with the fluidized bed. In this way, particles from the fluidized bed are entrained in the high velocity secondary gas and brought to the conical film of granulation liquid. In particular the secondary gas channel exit is not shielded from the fluidized bed.

The secondary gas has a relatively high velocity of e.g. at least 200 or at least 250 m/s, for instance 200 to 350 m/s at the exit of the secondary gas channel. This velocity refers to the velocity of the secondary gas in the secondary gas channel at the exit of that channel.

A high velocity may contribute to effective entrainment and supply of particles to the conical film. The gas feed pressure is e.g. 1.1 to 1.5 bar absolute. The secondary gas is preferably air. For example a gas stream is used with a temperature equal to, or max. 20° C. higher than, the temperature of the granulation liquid material.

The secondary gas contacts the conical film at a height h that is, for instance, in the range of 5 mm to 15 mm above the exit of the nozzle for the conical film, more preferably at a height in the range of 7.0 mm to 12 mm. A larger height may contribute to a larger lateral surface area of the conical film, thereby providing for more effective granulation. This height h can be referred to as the impact height.

The secondary gas flow is unconfined and typically flows generally upward. The secondary gas flow for example flows as a converging annulus (ring) upward.

The secondary gas stream is for instance guided by a tapered or sloped shoulder of the granulation liquid nozzle, as schematically illustrated in FIG. 2. The shoulder of the granulation liquid nozzle is converging in upward direction to provide a conical surface (conical frustum) with the smaller radius at the top. The shoulder of the granulation liquid nozzle for instance has an included angle with the vertical direction of 10°-40°, in particular 20°-30°. The lower end of the shoulder of the nozzle preferably is directly adjacent to the secondary gas channel, e.g. with less than 1 mm vertical and less than 1 mm horizontal spacing between the lower end of the shoulder of the nozzle and the secondary gas channel. Thereby secondary gas exiting the annular secondary gas channel is directly guided by the shoulder.

In embodiments with a tapered or sloped shoulder of the granulation liquid nozzle which converges in upward direction, the impact height (h) of secondary gas with the granulation liquid film can be taken as the height of the geometric intersection of the conical frustum of the granulation liquid (diverging in upward direction) and the conical frustum defined by the projection of the shoulder in upward direction. This is schematically illustrated in FIG. 3, with tapered shoulder (7) and secondary gas channel (5), and the projection (9) of the shoulder intersecting (10) with the conical film (f), thereby defining the height (h) between the nozzle (3), in particular the exit of the first channel (4), and the intersection plane (10). All other reference numbers in FIG. 3 are the same as in FIG. 2.

Preferably the mass ratio of the secondary gas stream, preferably air as the secondary gas, to the granulation liquid is at least 0.40, or at least 0.45, or at least 0.50 and/or e.g. up to 1.0 or up to 0.70, e.g. 0.40-1.0 or e.g. 0.45-0.70. The relatively high amount of secondary gas may advantageously contribute to low dust formation and may permit operation with a high liquid throughput, in particular in combination with a large lateral surface area of the conical film. A too high mass ratio, e.g. above 1.0, may increase a risk of disturbing the granulation process. The relatively high mass ratio of secondary gas to granulation liquid may advantageously contribute to a sufficiently small dry recycle percentage, such as a dry recycle of less than 70 wt. % relative to on-size particles. Herein, on-size particles are e.g. particles having a size of 2-4 mm. Without wishing to be bound by way of theory, the combination of relatively high gas to liquid mass ratio and relatively high gas velocity may provide the benefit of also nebulizing the film thus obtaining additional coating via droplets.

The conversion of a measured volumetric gas flow rate into a gravimetric density for the secondary gas can be done, using the density at ambient pressure (1 atm, 101.325 kPa absolute pressure) and 20° C., i.e. 1.18 kg/m$^3$ if air is used as the secondary gas (1.188 kg/m$^3$ for dry air, 1.182 kg/m$^3$ for 60% relative humidity).

Hence, preferably, for air as the secondary gas, the secondary gas flow is 0.34 to 0.85 Sm$^3$ secondary gas per kg granulation liquid, with Sm$^3$ indicating the gas volume in m$^3$ at reference conditions of 20° C. and 101.325 kPa absolute. Preferably, the secondary gas flow is at least 0.34 or at least 0.38 or at least 0.42 Sm$^3$ secondary gas per kg granulation liquid (mass ratio of at least 0.40, at least 0.45, or at least 0.50 respectively), and/or e.g. up to 0.84 or up to 0.59 Sm$^3$ secondary gas per kg granulation liquid (mass ratio up to 1.0 or up to 0.70); e.g. 0.34 to 0.85 Sm³ secondary gas per kg granulation liquid (mass ratio 0.40 to 1.0 or 0.38 to 0.59 Sm³ secondary gas per kg granulation liquid (mass ratio 0.45-0.70). A measured volumetric gas flow rate with measured temperature can be converted to the gas flow rate in Sm³ secondary gas. Advantages of this ratio of gas volume per kg liquid are the same as for the mass ratio.

Density for a granulation liquid in an embodiment wherein the granulation liquid is a urea melt which comprises e.g. at least 80 wt. % urea, is optionally set as 1220 kg/m³ if a volumetric flow rate of the granulation liquid is measured. The liquid density at a temperature of the granulation liquid measured at or close to the inlet of the granulator nozzle can be used for the conversion.

In an example embodiment, the process involves dry recycle of a part of the particles withdrawn from the granulator. Accordingly, in an example embodiment, the process involves withdrawing particles from the granulator, size fractionating the particles in desired-size particles, undersize particles, and oversize particles, and recycling undersize particles and/or crushed oversize particles to the granulator as seeds. Preferably, the fraction of recycled particles is at least 5 wt. %, or at least 10 wt. %, and/or up to 70 wt. % or up to 60 wt. % relative to the non-recycled desired-size particles.

In the invention, the opening of the annular channel for secondary gas is directly exposed to the granulation compartment, and is thereby directly exposed to the fluidized bed of particles. Accordingly, at least some particles from the fluidized bed in the granulation compartment are entrained by the secondary gas stream before the secondary gas stream hits the granulation liquid film. In particular, the opening of the secondary gas channel of the nozzle is not shielded from the fluidized bed. The secondary gas channel is preferably arranged immediately adjacent to the granulation liquid channel. The nozzle preferably comprises a unitary piece having a channel for granulation liquid and a tapered shoulder and providing the inner wall of the annular channel for secondary gas.

Without wishing to be bound by way of theory, particles at the lower part of the fluidized bed may be sucked into the high velocity secondary gas stream moving upward and generally radially inward with the gas stream until the secondary gas stream hits the conical film.

In a preferred embodiment, the secondary gas channel has an exit (outlet opening) into the fluidized bed at a vertical level that is at least 5 mm or at least 10 mm lower than the exit (outlet opening) of the first channel, preferably this vertical distance is 10-20 mm. In this way advantageously the high velocity secondary gas can better suck up and entrain particles from the fluidized bed before it contacts the granulation liquid film. The tapered shoulder of the granulation liquid nozzle guides the secondary gas flow up over this vertical distance. This vertical distance between the exits is shown as arrow (h2) in FIG. 2.

Preferably the secondary gas is in direct contact with the fluidized particles bed when travelling over said vertical distance. The vertical distance thereby provides (or contributes to) the free path distance of the secondary gas.

The process involves supplying entrained particles to said film by directing the secondary gas stream towards the film, causing the deposition of the granulation liquid on the surface of the particles and solidification of said deposited liquid resulting in growth of the particles. In particular the secondary gas stream with the entrained particles is directed to the film. This causes the deposition of the granulation liquid, from the film, on the surface of the particles. The process furthermore involves solidification of said deposited liquid resulting in growth of the particles. The process typical involves contacting the film with the secondary gas including entrained particles. This contacting causes the deposition of the granulation liquid on the surface of the particles. The process furthermore involves solidification of said deposited liquid resulting in growth of the particles.

The contact angle between the conical liquid film and the secondary gas stream is preferably in the range 40°-80°, more preferably 60°-80°

By the powerful upward stream of the secondary gas around the nozzle, a zone is created in the fluidized bed above the nozzle. The solidification of the deposited liquid may take place in this zone. The particles at an upper part of this zone are typically sufficiently dry, i.e. the applied granulation liquid is completely or almost completely solidified. Thereby agglomeration of the particles is avoided. The relatively high ratio of secondary gas to granulation liquid may contribute to a sufficient size of this zone for solidification.

In operation each nozzle has its own zone for drying of the particles located above it.

Suitably, the granulation liquid and said secondary gas are used with the ratio, referred to as dynamic pressure ratio in Example 1, $$\frac{\rho_{liq} V_{liq}^2}{\rho_{gas} V_{gas}^2}$$

in the range 1.5-10, for instance 3-8,
wherein ρ is the density in kg/m³ and V is the linear exit velocity in m/s.
Density for urea melt is optionally set as 1220 kg/m³.
The film preferably has a Weber number of at least 1000 and/or up to 5000, more preferably 2600-5000. Herein the Weber number We is:

$$We = \rho U^2 \delta \sigma^{-1}$$

wherein ρ is the density of the liquid in kg/m³; U is the velocity of the liquid in m/s, including the rotational component; σ is the surface tension of the liquid in N/m and δ is the film thickness in m upon exit from the first channel for granulation liquid. The surface tension for urea melt can be taken as 0.07 N/m. Density for urea melt is optionally set as 1220 kg/m³.

A liquid film with a Weber number in this range provides advantageously for sufficient internal turbulence of the film for a good granulation process.

The fluidized bed granulation process is advantageously carried out with a throughput of at least 200 kg/hr granulation liquid per nozzle, or at least 300 kg/hr, or at least 400 kg/hr, or at least 450 kg/hr, for example for urea melt. The fluidized bed granulation process is advantageously carried out with at least 0.15 m³/hr granulation liquid per nozzle, or at least 0.30 m³/hr, or at least 0.40 m³/hr, for example for urea melt.

A higher throughput per nozzle may for instance be used for reducing the number of nozzles in the granulator, e.g. by increasing the distance between the granulators, and/or for increasing the capacity of the granulator.

Preferably the conical film of granulation liquid has a lateral surface area of the conical frustum of at least 200 mm², more preferably at least 300 mm² or at least 400 mm² or even at least 450 mm², especially with a throughput of at least least 300 kg/hr, or at least 400 kg/hr, or at least 450 kg/hr granulation liquid, per nozzle and/or with at least 0.15 m³/hr granulation liquid per nozzle, or at least 0.30 m³/hr, or at least 0.40 m³/hr; with for example urea melt as granulation liquid. Herein, the conical frustum has a smaller radius $r_1$ at the nozzle and a larger radius $r_2$ at a height h in said upward direction above the nozzle and the process involves contacting the film with the secondary gas stream at height h (impact height h; as schematically illustrated in FIG. 2). In particular, $r_1$ is equal to the radius of the first channel at the exit for granulation liquid, and the frustum is conceptually made by the horizontal cut-off of the cone by the plane of the nozzle exit and the plane of the impact height h. The vertex angle θ of the cone is defined by vertex angle of the granulation liquid conical film. Accordingly, the conical frustum is defined by the diameter of the outlet opening of the first channel, the angle of the conical film, and the impact height h, with the frustum diverging in the direction from the outlet opening of the nozzle to the impact height.

In a preferred embodiment, the conical film has a lateral surface area of the conical frustum of at least 400 mm² with a throughput of at least 400 kg/hr granulation liquid per nozzle and/or with at least 0.30 m³/hr granulation liquid per nozzle, wherein the granulation liquid is for example urea melt.

The relatively large lateral area, in particular in combination with the relatively high ratio of secondary gas to granulation liquid, ensures that there is sufficient area of the film for the particles to be wetted (or covered) by the film. A too small lateral area may cause hindered particle growth, in particular at relatively high granulation liquid throughput, such as for larger film thickness at the nozzle exit.

A larger lateral surface area of the conical film may be obtained by one or more of a larger exit diameter of the first channel, a wider vertex angle θ of the cone, and a larger impact height; and in particular by the combination of these properties.

Also provided is a granulation nozzle that is especially suitable for the process of the invention. The invention also pertains to such a granulation nozzle With reference to the example nozzle seen in vertical cross-section in FIG. 4, the granulation nozzle (3) comprises the first channel (4) for granulation liquid and the secondary gas channel (5), wherein the secondary gas channel (5) is provided as an annulus around the first channel. The exit of the first channel comprises a diffuser (11) that is sloped and outwardly curved, in particular in a vertical cross-section. The curvature of the diffuser can be used to increase the vertex angle θ of the conical film by the Coanda effect. This in turn increases the lateral surface are of the conical film, which ensures that there is sufficient area of the film for the particles to be wetted by the film as mentioned.

The diffuser in particular provides or comprises a convex surface, i.e. a surface of the channel that is convex in the vertical cross-section, along the trajectory of the (ejected) granulation liquid and which surface is exposed to the granulation liquid in operation. Typically at least a part of the diffuser is in contact with the film of granulation liquid in operation, namely the part of the diffuser providing this surface. Hence, the diffuser is a curved, concave, diffusor for the granulation liquid film. The mentioned vertical cross-section is a cross-section through the nozzle and more in particular through the central axis of the first channel. The first channel is typically circular in top view or in a horizontal cross section through it and the diffuser usually is curved and concave in top view or in horizontal cross-section. Alternatively or additionally, the direction of the first channel defines a length direction (vertical in FIG. 4 and in operation) and the radial plane is perpendicular to the length direction, i.e. horizontal in FIG. 4 and in operation.

In an embodiment (not shown), the exit of the first channel comprises, in liquid flow direction, i.e. in upward direction, a vertical straight part, a curved convex part as a diffuser, and an outwardly sloped straight part; in particular wherein the diffuser is convex in vertical cross-section.

Figure 4:
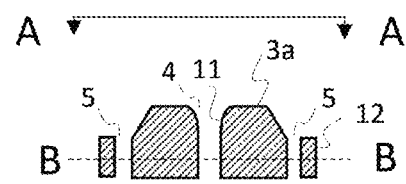
FIG. 4 schematically illustrates an example granulation nozzle with a diffuser, as provided by an aspect of the invention.

The radius of curvature of the diffuser part is e.g. 50-150% of the radius of the first channel. For surfaces, the radius of curvature is the radius of a circle that best fits a normal section or combinations thereof. The surface at the upper end of the diffuser (downstream end for liquid flow) is e.g. inclined at 20° to 60° to vertical. FIG. 4 shows a modification of the nozzle of FIG. 1B by adding the diffuser (11).

Preferably the nozzle has a sloped (or tapered) shoulder from an exit of the secondary gas channel (5) upward towards the first channel. More preferably the sloped shoulder is converging in upward direction. The sloped shoulder can be configured for guiding gas from the secondary gas channel (5) towards the conical film of granulation liquid from the first channel.

Preferably in operation of the nozzle with the diffuser, a hollow conical film of the granulation liquid ejected from the first channel by giving the liquid material a rotational movement (rotational in the horizontal plane).

For example the nozzle comprises a rotation chamber (also referred to as swirl chamber) upstream for granulation liquid of the first channel; with all preferences and details for the swirl chamber as discussed hereinbefore. For example, the nozzle with the diffusor is a tangential-flow hollow cone nozzle. In a further embodiment, the nozzle with the diffuser, is an axial hollow cone nozzle. For instance the nozzle comprises a swirl insert with spiral grooves to cause whirling of the granulation liquid.

Figure 5:
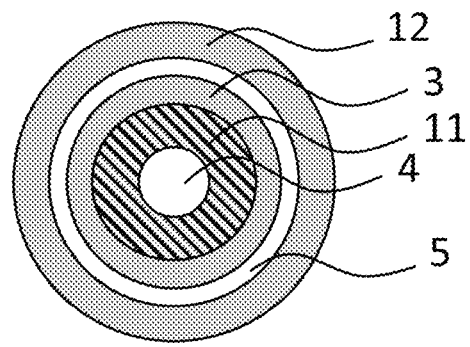
FIG. 5 shows a top view (A-A) of the nozzle of FIG. 4.

FIG. 5 shows a top view (A-A in FIG. 4) of the nozzle. Grey parts indicate metal parts in the horizontal cross-section B-B in FIG. 4, white indicates the annular openings in said cross-section. The diffuser (11) is hatched. The first channel (4) is concave in the horizontal cross-section B-B and the diffuser (11) is similarly concave in a horizontal cross-section through it.

Figure 6:
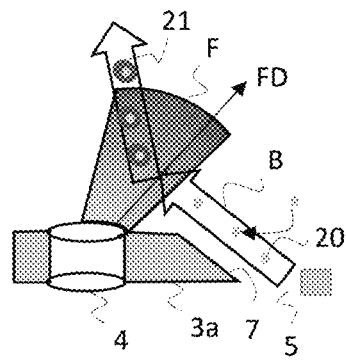
FIG. 6 schematically shows a conceptual operation of the nozzle, in particular with the hollow conical film.

FIG. 6 schematically shows a conceptual operation of the nozzle, in particular with the hollow conical film. Reference numbers are the same as in FIG. 2. Without wishing to be bound by way of theory, the secondary gas (B) flows over sloped shoulder (7) from the secondary gas channel (5) and entrains particles (20). In other words, particles from the lower part of the fluidized bed are entrained in the secondary gas stream which has a high velocity. The secondary gas stream with the entrained particles hits the hollow conical film (F) of the granulation liquid ejected from the channel (4) and the entrained particles are as a result covered (i.e. wetted) by a layer of granulation liquid (21) which subsequently solidifies in the continuation of the gas stream. It is noted that the film is possibly no longer be a perfect film at the impact zone and may be deformed already when encountering the secondary gas. At the impact zone, the film may break up to some extent by the action the secondary gas. Arrow (FD) indicates the liquid flow direction in the vertical cross-section. A background reference for granulation using an ejected conical film of granulation liquid is EP 0141436.

The invention also pertains to a fluidized bed granulator comprising a granulation compartment. The granulation compartment comprises at least one granulation nozzle as described herein, i.e. with the curved diffuser as discussed.

The compartment also comprises a perforated fluidization plate at a lower part of the granulation compartment, e.g. as the bottom of the compartment. The granulation nozzle, with the diffuser, extends from a bottom part of the granulator upward (i.e. the nozzle extends vertically upward) through the fluidization plate with the exit of the first channel projecting upward into the granulation compartment. Preferably the granulator comprises two or more granulation compartments in series and each granulation compartment preferably comprises at least 10 of such granulation nozzles. Preferably, the granulation compartments are separated from each other by vertical dividing plates as discussed, with passageways for granules at the bottom of the vertical dividing plates; and with preferably a seed particles inlet at one side and preferably particles outlet at an opposite side of the granulator as discussed, wherein these sides are opposite in the horizontal plane and with the particles outlet defining the side of the granulator where the downstream granulator compartment of the series of granulator compartments is located. Preferably, in operation, a gradient of the average particle size is maintained over the granulation compartment in series, with larger particles in the downstream granulation compartment that is closer to the particles outlet.

The granulator typically has an exit at the top or upper part for off-gas, an inlet for seed particles and an exit for formed granules, and a supply manifold for granulation liquid from an inlet for granulation liquid of the granulator to a plurality of first channels of a plurality of the nozzles. The granulator furthermore typically comprises a fluidization air compartment for receiving fluidization gas (air) arranged below the granulation compartment, with the fluidization plate between the bottom compartment and the granulation compartment; such that in operation fluidization gas flows through the perforations of the fluidization plate from the lower compartment into the granulation compartment, in particular flows in upward direction. The vertical direction can also be referred to as the longitudinal direction, defined by the direction of the first channel; and the horizontal plane can then be referred to as the radial plane perpendicular to the longitudinal direction. In operation or installed, the nozzle extends vertically upward with respect to gravity, ensuring the correct formation of a fluidized bed of particles in operation.

In embodiments, the inventive process is preferably carried out in this fluidized bed granulator, wherein the curved diffuser is optional.

The invention also pertains to a urea plant comprising a urea melt plant and a fluidized bed granulator as described. The outlet for the urea melt of the urea melt plant is connected to an inlet for granulation liquid of the fluidized bed granulator. The urea melt plant comprises e.g. a synthesis section for forming urea, typically a recovery section, and an evaporation section having an outlet for urea melt. The urea plant is e.g. of the stripping type. The synthesis section is a high pressure synthesis section and comprises a reactor and, for urea plants of the stripping type, also, a stripper and a condenser, wherein the reactor and condenser are optionally combined in a single vessel. The synthesis section has an inlet for $NH_3$ feed and $CO_2$ feed. The recovery section may comprise one or more dissociator and typically comprises a condenser for condensing gas from the dissociator and having a recycle line for carbamate from the condenser to the synthesis section The invention also provides a fluidized bed granulation process carried out with a nozzle as described with a diffusor, and/or in a fluidized bed granulator comprising such a nozzle with a diffusor. The process comprises providing a fluidized bed of particles in a granulation compartment of a fluidized bed granulator. The process further involves forming a film of the granulation liquid in the form of a hollow conical frustum, which frustum projects into the granulation compartment, by supplying the granulation liquid through a first channel of a granulation nozzle. Hence, in the process, the granulation liquid is ejected from the first channel, and a film of the granulation liquid is formed or provided, which film has the shape of a hollow conical frustum.

The process further involves supplying secondary gas stream, preferably air, through a secondary gas channel of the granulation nozzle into the granulation compartment, wherein the secondary gas channel is provided as an annulus around the first channel. The exit of the secondary gas channel is directly exposed to the fluidized bed in the granulation compartment, and particles from the fluidized bed are entrained in said secondary gas stream. The process further involves supplying (at least some) entrained particles to said film by directing the secondary gas stream towards the film. Hence, the secondary gas stream with the entrained particles in it is directed to the film. This causes the deposition of the granulation liquid on the surface of the particles and solidification of said deposited liquid, resulting in growth of the particles.

The fluidized bed granulation process with the nozzle with a diffusor is advantageously carried out with a throughput of at least 300 kg/hr granulation liquid per nozzle, or at least 400 kg/hr, or at least 450 kg/hr, for example for urea melt. The fluidized bed granulation process is advantageously carried out with at least 0.30 $m^3$/hr granulation liquid per nozzle (per individual nozzle), or at least 0.40 $m^3$/hr, for example for urea melt. Note that 0.30 $m^3$/hr granulation liquid per nozzle is 83 ml per second, supplied through a film with about 5 mm diameter and about 500 μm thickness at the liquid outlet, All preferences for the granulation process according to the invention apply equally for the fluidized bed granulation process carried out with a nozzle as described with a diffusor, and/or in a fluidized bed granulator comprising such a nozzle with a diffusor. The granulation process as described herein, for instance having the specified ratio of secondary gas to granulation liquid, is preferably carried out using a nozzle as described with a diffusor, and/or in a fluidized bed granulator comprising such a nozzle with a diffusor; with the same preferences for the nozzle and fluidized bed granulator. The granulation liquid preferably is a urea melt comprising at least 70 wt. % or at least 90 wt. % urea and preferably less than 5 wt. % water. All preferences for the construction of the nozzle discussed in connection with the fluidized bed granulation process, such as the tapered or sloped shoulder, apply equally for the nozzle with the diffusor. The secondary gas-to-liquid ratio is optional but preferred for the granulation liquid with the diffusor. The diffuser is optional but preferred for the granulation process with the secondary gas to liquid ratio.

At least the terms "typically", "usually" and "in particular" indicate features that are frequently used but are not mandatory for all embodiments.

EXAMPLES

Aspects of the invention are illustrated in the following examples, which limit neither the invention nor the claims.

Example 1

Two nozzles according to the invention were simulated using CFD. Process settings are shown in Table 1. Nozzle 2 had a larger inner diameter of the secondary gas channel than Nozzle 01 and a larger diameter of the nozzle front head. Nozzle 2 has a curved diffuser as described in the present disclosure and as schematically shown in FIG. 4. Air was used as the secondary gas.

TABLE 1

|  |  | Nozzle 1 | Nozzle 2 |
|---|---|---|---|
| Urea melt | kg/hr | 200/240 | 500 |
| Weber number |  | 1285 (200 kg/h) 1853 (240 kg/h) | 3203 |
| Liquid feed pressure | bar (abs) | 3.15 | 4.3 |
| Liquid velocity | m/s | 12.25 | 19.3 |
| Film thickness exit | μm | 491 | 485 |
| Film thickness impact height | μm | 90 | 90 |
| Liquid outlet diameter | mm | 2.9 | 4.8 |
| Secondary gas feed pressure | bar (abs) | 1.39 | 1.28 |
| Secondary gas velocity | m/s | 300 | 270 |
| Secondary gas flow | kg/hr | 105 | 262 |
| Mass ratio secondary gas/liquid |  | 0.525 | 0.525 |
| Vertical distance between liquid exit and secondary gas exit | cm | 1.3 | 1.239 |
| Film angle (without secondary gas) | ° | 64.5 | 96° |
| Film angle (with secondary gas) |  | 58.2 | 90 |
| Slope liquid nozzle | ° | 22.5 | 22.5 |
| Impact height from granulation liquid exit | mm | 8.3 | 8.3 |
| Dynamic pressure ratio |  | 1.79 | 5.99 |

Example 2

Nozzle 1 and 2 of Example 1 were tested in a pilot scale plant for urea granulation. Results are given in Table 2 below. Dry recycle consists of fines (undersize particles) and crushed oversize particles. Dry recycle is given as percentage of the on size product. The dry recycle is reintroduced as particles into the granulator through a separate inlet, not through the nozzles. For Nozzle 1, with load 200 kg/h, the stream at the particles outlet of the granulator consisted of 200 kg/h on-size granules and 104 kg/h dry recycle. For Nozzle 1, the dry recycle was 99% fines and 1% coarse. The particles mixture the particles outlet of the granulator is subjected to size classification by sieving with two sieves, and the oversized particles are crushed. The granulator has a gas outlet; the gaseous emissions contain some urea dust such that production is lower than melt load.

Dry recycle for a commercial plant is typically in the range 30-60%.

For Nozzle 2, the dust level, including dust from the crusher for oversized particles, was 3.8% at 500 kg/hr, within the range of 2.8-4% observed for commercial granulation plants. Air was used as the secondary gas.

TABLE 2

|  | Nozzle 1 | | Nozzle 2 | | |
|---|---|---|---|---|---|
| Melt Load (kg/h) | 200 | 220 | 400 | 450 | 500 |
| Production (kg/h) | 195 | 214 | 361 | 423 | 433 |
| Dry recycle wt. % | 52 | 64 | 32 | 50 | 69 |

The invention claimed is:

1. A fluidized bed granulator comprising a granulation compartment comprising a perforated fluidization plate at a lower part of the compartment and at least one nozzle, wherein the nozzle comprises a first channel for granulation liquid and a secondary gas channel, wherein the secondary gas channel is provided as an annulus around the first channel, wherein the exit of the first channel comprises a diffuser that is sloped and outwardly curved to provide a convex surface in a vertical cross-section for the granulation liquid exiting the first channel, and wherein the nozzle extends through the fluidization plate with the exit of the first channel projecting upward into the granulation compartment.

2. A fluidized bed granulator according to claim 1, wherein the nozzle has a sloped shoulder from an exit of the secondary gas channel upward towards the first channel.

3. A fluidized bed granulator according to claim 1 or 2, wherein the granulator comprises a plurality of granulation compartments in series, wherein the fluidization gas is introduced into each of the granulation compartments through perforations in a perforated fluidization plate provided at the bottom of the granulation compartments, which each of the plurality of granulation compartments contains a plurality of the nozzles that are operated with the specified ratio of secondary gas to granulation liquid and wherein the granulation compartments are separated from each other by vertical dividing plates which provide for passageways for particles at a bottom part from one granulation compartment to an adjacent granulation compartment.

4. A urea plant comprising a urea melt plant and a fluidized bed granulator according to claim 1.

5. A fluidized bed granulation process carried out in a fluidized bed granulator according to claim 1, the process comprising:
   a. providing a fluidized bed of particles in the granulation compartment of the fluidized bed granulator;
   b. forming a film of the granulation liquid in the form of a hollow conical frustum projecting into the granulation compartment by supplying the granulation liquid through the first channel of the granulation nozzle; the granulation nozzle having the diffuser that is sloped and outwardly curved to provide a convex surface in a vertical cross-section for the granulation liquid exiting the first channel;
   c. supplying secondary gas stream through the secondary gas channel of the granulation nozzle into the granulation compartment, wherein the secondary gas channel is provided as an annulus around the first channel, wherein the exit of the secondary gas channel is directly exposed to the fluidized bed in the granulation compartment, wherein particles from the fluidized bed are entrained in said secondary gas stream; and
   d. supplying entrained particles to said film by directing the secondary gas stream comprising entrained particles towards the film, causing the deposition of the granulation liquid on the surface of the particles and solidification of said deposited liquid resulting in growth of the particles.

6. A fluidized bed granulator according to claim 1, wherein the radius of curvature of the diffuser part is 50-150% of the radius of the first channel.

7. A fluidized bed granulator according to claim 1, wherein surface at the upper end of the diffuser is inclined at 20° to 60° to vertical.

8. The fluidized bed granulator according to claim 1, wherein the diameter of the first channel at the exit is at least 3.0 mm.

9. A urea plant according to claim 4, wherein the urea melt plant comprises a high pressure synthesis section for forming urea, a recovery section, and an evaporation section having an outlet for urea melt,
- wherein the high pressure synthesis section comprises a reactor and has an inlet for $NH_3$ feed and $CO_2$ feed,
- wherein the recovery section comprises a dissociator and a condenser for condensing gas from the dissociator and has a recycle line for carbamate from the condenser to the synthesis section, and
- wherein an outlet for the urea melt of the urea melt plant is connected to an inlet for granulation liquid of the fluidized bed granulator.

10. The process of claim 5, wherein the granulation liquid is a urea melt comprising at least 70 wt. % urea.

11. The process of claim 10, wherein the granulation liquid is a urea melt comprising at least 90 wt. % urea and less than 5 wt. % water.

12. The process of claim 5, carried out with urea melt as the granulation liquid and with a throughput of at least 300 kg/hr urea melt per nozzle.

13. The process of claim 5, wherein the product particles are spherical and have a diameter of at least 2.0 mm.

14. The process of claim 5, wherein the fluidized bed of particles has a height of 50 to 150 cm.

15. The process of claim 5, wherein the conical film is formed by giving the granulation liquid a rotational movement in the first channel, with the rotation of the granulation liquid about a vertical axis.

* * * * *